(12) United States Patent
Sobel et al.

(10) Patent No.: US 9,000,886 B2
(45) Date of Patent: Apr. 7, 2015

(54) METHOD, COMPUTER PROGRAM PRODUCT, AND SYSTEM FOR PREVENTING INADVERTENT CONFIGURATION OF ELECTRONIC DEVICES PROVIDED WITH INFRARED DATA ASSOCIATION INTERFACES

(75) Inventors: Michael Ezra Sobel, Westminster, CO (US); Xiaoling DiGrazia, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 1017 days.

(21) Appl. No.: 12/933,906

(22) PCT Filed: Apr. 1, 2008

(86) PCT No.: PCT/US2008/059007
§ 371 (c)(1),
(2), (4) Date: Sep. 22, 2010

(87) PCT Pub. No.: WO2009/123620
PCT Pub. Date: Oct. 8, 2009

(65) Prior Publication Data
US 2011/0018681 A1    Jan. 27, 2011

(51) Int. Cl.
*G09B 21/00* (2006.01)
*G08C 19/12* (2006.01)
*G05B 11/01* (2006.01)
*H04K 1/00* (2006.01)
*H04N 7/08* (2006.01)
*G06F 3/023* (2006.01)

(52) U.S. Cl.
CPC .................... *G06F 3/0236* (2013.01)

(58) Field of Classification Search
USPC ............ 340/4.3, 825.72, 12.23, 6.1; 341/173, 341/25, 31; 324/686, 690; 382/124, 127, 382/126, 190
See application file for complete search history.

(56) References Cited

U.S. PATENT DOCUMENTS

| | | | | |
|---|---|---|---|---|
| 5,020,037 | A  * | 5/1991 | Raven | 368/10 |
| 6,031,465 | A  * | 2/2000 | Burgess | 340/5.54 |
| 6,161,655 | A  * | 12/2000 | Lejon et al. | 187/392 |
| 6,995,747 | B2 * | 2/2006 | Casebolt et al. | 345/157 |
| 7,379,570 | B2 * | 5/2008 | Shyu et al. | 382/124 |
| 7,554,463 | B2 * | 6/2009 | Ulius-Sabel et al. | 341/22 |
| 7,812,825 | B2 * | 10/2010 | Sinclair et al. | 345/173 |

(Continued)

FOREIGN PATENT DOCUMENTS

| | | |
|---|---|---|
| EP | 0057446 A1 | 8/1982 |
| EP | 0499497 A2 | 8/1992 |

(Continued)

*Primary Examiner* — Fekadeselassie Girma
(74) *Attorney, Agent, or Firm* — The Ollila Law Group LLC

(57) ABSTRACT

The present invention relates to a method, computer program product, and system for preventing an inadvertent configuration of an electrical device provided with an infrared interface (30). The method, computer program product, and system include activation of one or more infrared buttons (31, 32, 33, or 34) provided on the infrared interface (30) in order to configure the electrical device. The method, computer program product, and system include a display (40) that indicates an infrared button sequence), wherein said button sequence is entered before the configuration occurs and includes activation of at least a first infrared button (31, 32, 33, or 34) and at least a second infrared button (31, 32, 33, or 34).

21 Claims, 5 Drawing Sheets

(56) References Cited

U.S. PATENT DOCUMENTS

| | | | |
|---|---|---|---|
| 7,830,160 B2* | 11/2010 | Philipp | 324/686 |
| 2002/0003892 A1* | 1/2002 | Iwanaga | 382/124 |
| 2002/0024713 A1* | 2/2002 | Roberts et al. | 359/267 |
| 2002/0110242 A1* | 8/2002 | Bruwer | 380/255 |
| 2003/0212481 A1* | 11/2003 | Fuller | 701/36 |
| 2004/0145114 A1* | 7/2004 | Ippolito et al. | 273/148 R |
| 2005/0078027 A1* | 4/2005 | Philipp | 341/173 |
| 2005/0162389 A1* | 7/2005 | Obermeyer et al. | 345/161 |
| 2005/0169506 A1* | 8/2005 | Fenrich et al. | 382/127 |
| 2008/0088474 A1* | 4/2008 | Hardacker et al. | 340/825.72 |
| 2009/0174662 A1* | 7/2009 | Kato | 345/163 |
| 2012/0075442 A1* | 3/2012 | Vujic | 348/61 |

FOREIGN PATENT DOCUMENTS

| | | |
|---|---|---|
| GB | 2359401 A | 8/2001 |
| JP | 08263215 | 11/1996 |
| JP | 200151777 | 2/2001 |
| JP | 200192576 | 6/2001 |
| JP | 2006041726 A | 9/2006 |
| JP | 2006209306 | 10/2006 |
| JP | 2007222298 | 6/2007 |
| JP | 2008065373 | 3/2008 |
| WO | 8504295 A1 | 9/1985 |

* cited by examiner

METHOD, COMPUTER PROGRAM PRODUCT, AND SYSTEM FOR PREVENTING INADVERTENT CONFIGURATION OF ELECTRONIC DEVICES PROVIDED WITH INFRARED DATA ASSOCIATION INTERFACES

FIELD OF THE INVENTION

The present invention relates to a method, computer program product, and system for preventing inadvertent configuration of electronic devices provided with infrared data association interfaces.

BACKGROUND OF THE INVENTION

Electronic devices often include an interface that allows an operator to configure the operation of the electronics. By way of example, printers, copiers, televisions, and a variety of other electronic devices include one or more buttons that allow a user to open one or more menus, select one or more options, deactivate the device, or activate the device.

Certain electronic interfaces utilize infrared interfaces for configuration purposes. Infrared interfaces include one or more infrared buttons that are provided with an infrared emitter, an infrared detector, and, typically, a lens. Infrared radiation is directed from the infrared emitter towards the lens. Since at least a portion of the infrared radiation passes through the lens, when an object, such as, for example, a persons finger is placed on the lens, at least a portion of the infrared radiation is reflected and detected by the infrared detector. In this manner, a user is able to configure the electronic device, such as, for example, by triggering the opening of one or more menus on a display, selecting one or more options, and activating or deactivating the electronic device.

Since almost any object placed on the lens or even near the lens is capable of reflecting the infrared radiation, it is a problem that infrared buttons may be unintentionally activated at times. For example, any debris or liquid droplets on the lens may reflect the infrared radiation and unintentionally activate the button. By way of yet another example, a person's body, clothing, or any other object on or even close to the lens may also inadvertently reflect the infrared radiation and unintentionally activate the button. This may result in the one or more electronics being configured unintentionally.

The present invention relates to a method, computer program product, and system for preventing inadvertent configuration of electronic devices provided with infrared buttons.

SUMMARY OF THE INVENTION

The scope of the present invention is defined solely by the appended claims, and is not affected to any degree by the statements within this summary.

According to one embodiment of the present invention, a method for preventing an inadvertent configuration of an electrical device provided with an infrared interface, comprises the steps of activation of one or more infrared buttons provided on the infrared interface in order to configure the electrical device, indicating an infrared button sequence on a display, wherein said button sequence includes activation of at least a first infrared button and at least a second infrared button, and entering the infrared button sequence before the configuration occurs.

According to another embodiment of the present invention, a computer program product comprising computer usable medium including executable code for executing a process for preventing an inadvertent configuration of an electrical device provided with an infrared interface, the process comprises the steps of activation of one or more infrared buttons provided on the infrared interface in order to configure the electrical device, indicating an infrared button sequence on a display, wherein said button sequence includes activation of at least a first infrared button and at least a second infrared button, and entering the infrared button sequence before the configuration occurs.

According to yet another embodiment of the present invention, a system for preventing an inadvertent configuration of an electrical device provided with an infrared interface comprises the electrical device, the infrared interface, and a display. The infrared interface is provided with a plurality of infrared buttons, wherein one or more of the infrared buttons are activated in order to configure the electrical device. The display indicates an infrared button sequence that is entered before the configuration occurs, wherein the infrared button sequence includes activation of at least a first infrared button and at least a second infrared button.

ASPECTS

According to one aspect of the present invention, a method for preventing an inadvertent configuration of an electrical device provided with an infrared interface comprises the steps of:
  activation of one or more infrared buttons provided on the infrared interface in order to configure the electrical device;
  indicating an infrared button sequence on a display, wherein said button sequence includes activation of at least a first infrared button and at least a second infrared button; and
  entering the infrared button sequence before the configuration occurs.

Preferably, the infrared button sequence includes the step of activation of at least two buttons sequentially.

Preferably, the infrared button sequence includes the step of activation of at least two buttons simultaneously.

Preferably, a time limit is imposed on the infrared button sequence or at least one step in the infrared button sequence.

Preferably, the electrical device is a measurement device.

Preferably, the step of activation of the one or more infrared buttons provided on the infrared interface in order to configure the electrical device occurs before the step of entering the infrared button sequence.

Preferably, the step of activation of the one or more infrared buttons provided on the infrared interface in order to configure the electrical device occurs after the step of entering the infrared button sequence.

According to another aspect of the present invention, a computer program product comprising computer usable medium including executable code for executing a process for preventing an inadvertent configuration of an electrical device provided with an infrared interface, the process comprises the steps of:
  activation of one or more infrared buttons provided on the infrared interface in order to configure the electrical device;
  indicating an infrared button sequence on a display, wherein said button sequence includes activation of at least a first infrared button and at least a second infrared button; and
  entering the infrared button sequence before the configuration occurs.

Preferably, the infrared button sequence includes the step of activation of at least two buttons sequentially.

Preferably, the infrared button sequence includes the step of activation of at least two buttons simultaneously.

Preferably, a time limit is imposed on the infrared button sequence or at least one step in the infrared button sequence.

Preferably, the electrical device is a measurement device.

Preferably, the step of activation of the one or more infrared buttons provided on the infrared interface in order to configure the electrical device occurs before the step of entering the infrared button sequence.

Preferably, the step of activation of the one or more infrared buttons provided on the infrared interface in order to configure the electrical device occurs after the step of entering the infrared button sequence.

According to yet another aspect of the present invention, a system for preventing an inadvertent configuration of an electrical device provided with an infrared interface comprises:

the electrical device;

the infrared interface provided with a plurality of infrared buttons, wherein one or more of the infrared buttons are activated in order to configure the electrical device; and a display that indicates an infrared button sequence that is entered before the configuration occurs, wherein the infrared button sequence includes activation of at least a first infrared button and at least a second infrared button.

Preferably, the infrared button sequence includes the step of activation of at least two buttons sequentially.

Preferably, the infrared button sequence includes the step of activation of at least two buttons simultaneously.

Preferably, a time limit is imposed on the infrared button sequence or at least one step in the infrared button sequence.

Preferably, the electrical device is a measurement device.

Preferably, the step of activation of the one or more infrared buttons provided on the infrared interface in order to configure the electrical device occurs before the step of entering the infrared button sequence.

Preferably, the step of activation of the one or more infrared buttons provided on the infrared interface in order to configure the electrical device occurs after the step of entering the infrared button sequence.

Preferably, the infrared buttons include a lens, an infrared radiation emitter, and an infrared radiation detector and the plurality of IrDA buttons are activated by using the radiation detector to detect infrared radiation emitted by the infrared radiation emitter and reflected toward the radiation detector.

DETAILED DESCRIPTION OF THE PRESENTLY PREFERRED EMBODIMENT

The present invention is broadly related to any electrical device that includes infrared buttons that are activated to configure the electrical device. Although FIG. 1 illustrates an example of an electrical device as a measurement device in the form of a flow measurement device 5 comprising a sensor assembly 10 and one or more electronics 20, those of ordinary skill in the art will appreciate that principals of the present invention are not limited to measuring devices and may be applied to any electrical device provided with infrared buttons.

Figure 1:
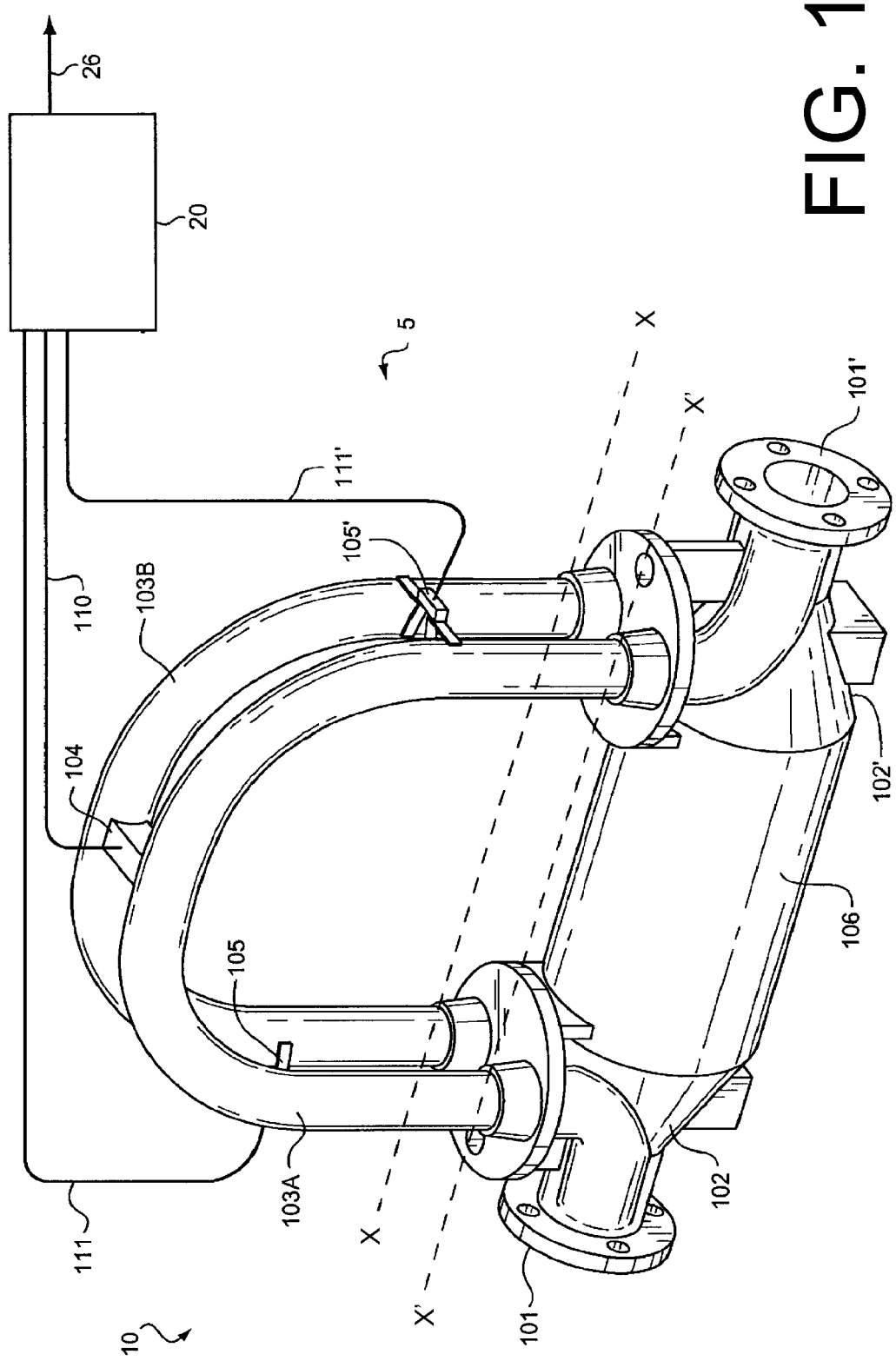
FIG. 1 depicts a perspective view of an electrical device in the form of a measurement device according to an embodiment of the present invention.

FIG. 1 illustrates the sensor assembly 10 and one or more electronics 20 of a flow measuring device 5 in the form of a Coriolis flow meter. As shown in FIGS. 2-5, the one or more electronics 20 may be located within a housing 25 that includes an infrared interface 30 that allows a user to configure the flow measuring device 5 in a number of ways.

The flow measuring device 5 of the present embodiment includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits extend outwardly from the manifolds in an essentially parallel fashion. When sensor assembly 10 is inserted into a pipeline system (not shown) which carries the flowing substance, the substance enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through flange 101'.

The flow measuring device 5 of the present example includes a drive 104. The drive 104 is affixed to conduits 103A, 103B in a position where the drive 104 can vibrate the conduits 103A, 103B in the drive mode. In the present embodiment, the drive mode is the first out of phase bending mode and the conduits 103A and 103B are preferably selected and appropriately mounted to inlet manifold 102 and outlet manifold 102' so as to have substantially the same mass distribution, moments of inertia, and elastic modules about bending axes W-W and W'-W' respectively. In the present example, where the drive mode is the first out of phase bending mode, the conduits 103A and 103B are driven by drive 104 in opposite directions about their respective bending axes W and W'. Drive 104 may comprise one of many well known arrangements, such as a magnet mounted to conduit 103A and an opposing coil mounted to conduit 103B. Alternatively the drive 104 may comprise a different arrangement, such as, for example, one or more piezoelectric devices. A drive signal in the form of an alternating current is provided by one or more electronics 20, such as for example via pathway 110, and passed through the opposing coil to cause both conduits 103A, 103B to oscillate.

The flow measuring device 5 of the present embodiment includes a pair of pick-offs 105, 105' that are affixed to conduits 103, 103B. In the embodiment depicted, the pick-offs 105, 105' are located at opposing ends of the conduits 103A, 103B. The pick-offs 105, 105' detect motion of the conduits 103A, 103B and provide pick-off signals to one or more electronics 20 that represent the motion of the conduits 103A, 103B. For example, the pick-offs 105, 105' may supply pick-off signals to the one or more electronics via pathways 111, 111'. Those of ordinary skill in the art will appreciate that the motion of the conduits 103A, 103B is proportional to the mass flow rate and density of the material flowing through the conduits 103A, 103B.

In the present embodiment, the one or more electronics 20 receive the pick-off signals from the pick-offs 105, 105' and provide a drive signal to the drive 104. Path 26 provides an input and an output means that allows one or more electronics 20 to interface with an operator or one or more other electronics.

According to one aspect of the present embodiment, the one or more electronics 20 measure a characteristic of a flowing substance, such as, for example, density, mass flow rate, volume flow rate, totalized mass flow, temperature, and other information. More particularly, the one or more electronics 20 receive one or more signals, for example from pick-offs 105, 105' and one or more temperature sensors, and uses this information to measure a characteristic of a flowing substance, such as, for example, density, mass flow rate, volume flow rate, totalized mass flow, temperature, and other information. The techniques by which flow measuring devices, such as, for example, Coriolis flow meters or densitometers, measure a characteristic of a flowing substance are well understood; and, therefore, a detailed discussion is unneeded to understand the present invention and is omitted for brevity. Furthermore, an explanation of the circuitry of one or more electronics 20 is unneeded to understand the present invention and is omitted for brevity of this description.

Those of ordinary skill in the art will appreciate that the description of FIG. 1 is provided merely as an example of the operation of one possible electronic device in the form of a flow measuring device 5 and is not intended to limit the teaching of the present invention. Those of ordinary skill in the art will appreciate that it is within the scope of the present invention to use the principals discussed herein in conjunction with any type of electronic device, for example, and not limitation, any measurement device, such as, flow transmitters, density transmitters, pressure transmitters, temperature transmitters, magnetic flowmeters, vortex flowmeters, and ultrasonic flowmeters, or any other electronic device.

Figure 2:
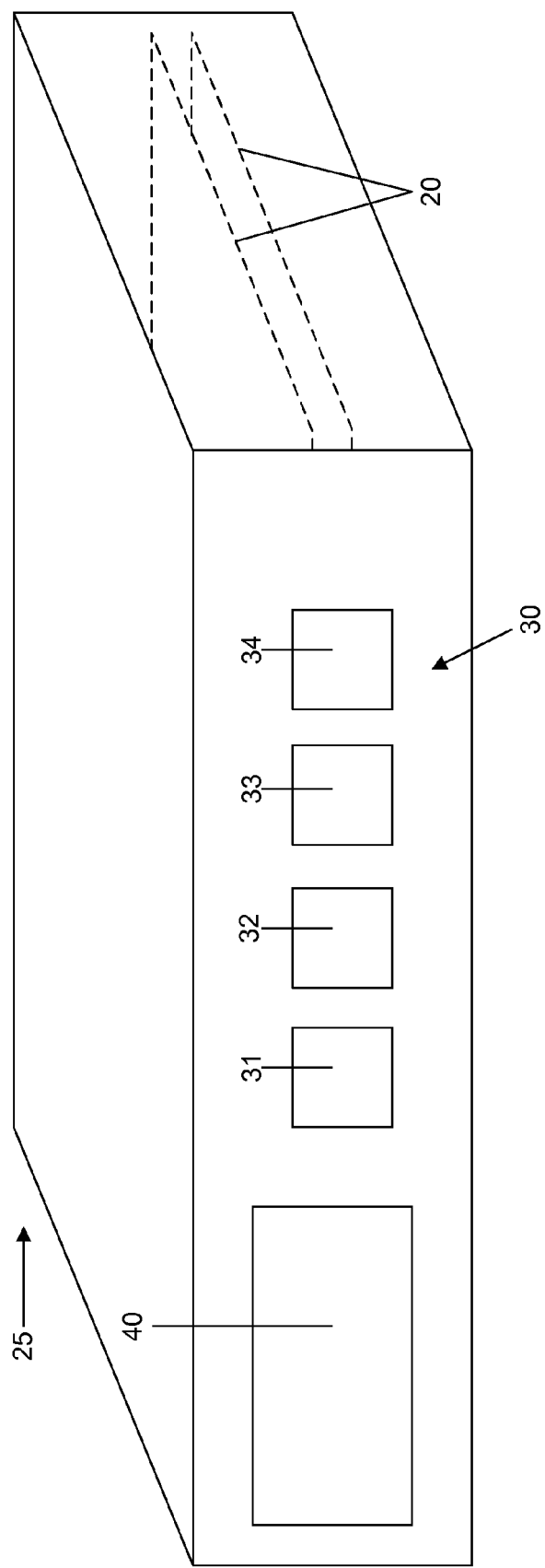
FIG. 2 depicts a perspective view of an infrared interface provided with infrared buttons.

Turning now to FIG. 2, the one or more electronics 20 are shown located in a housing 25. As shown, the housing 25 may include a display 40, which may indicate a variety of information related to the flow measuring device 5 or the substance flowing within the sensor assembly 10. For example, and not limitation, the display 40 may indicate configuration options, for example, and not limitation, via a menu, for the flow measuring device 5, the current configuration of the flow measuring device 5, or a measured characteristic of the substance flowing through the sensor assembly 10. Although the display is shown integral to the housing 25, those of ordinary skill in the art will appreciate that it is within the scope of the present invention to connect the housing 25 or one or more electronics 20 to an external display.

As shown in FIGS. 2-5, the housing 25 includes an infrared interface 30. The infrared interface 30 is provided with least two infrared buttons 31, 32 and may, within the scope of the present embodiment include more than two infrared buttons, for example, and not limitation, three infrared buttons 31, 32, 33, four infrared buttons 31, 32, 33, 34, as shown in FIGS. 2-5, or more than four infrared buttons.

According to one aspect of the present embodiment, the infrared buttons 31-34 may perform any number of configuration actions. For example, and not limitation, the infrared buttons 31-34 may allow a user to configure the operation flow measuring device 5. By way of yet another example, and not limitation, the infrared buttons 31-34 may allow a user to determine the type of information that is indicated on the display 40, for example, and not limitation, configuration options, the current configuration of the flow measuring device 5, one or more measured characteristics of the substance flowing in the sensor assembly 10, or any alarms or messages, for example, and not limitation, error messages. By way of yet another example, and not limitation, the infrared buttons 31-34 may allow a user to activate or deactivate the flow measuring device 5.

Figure 3:
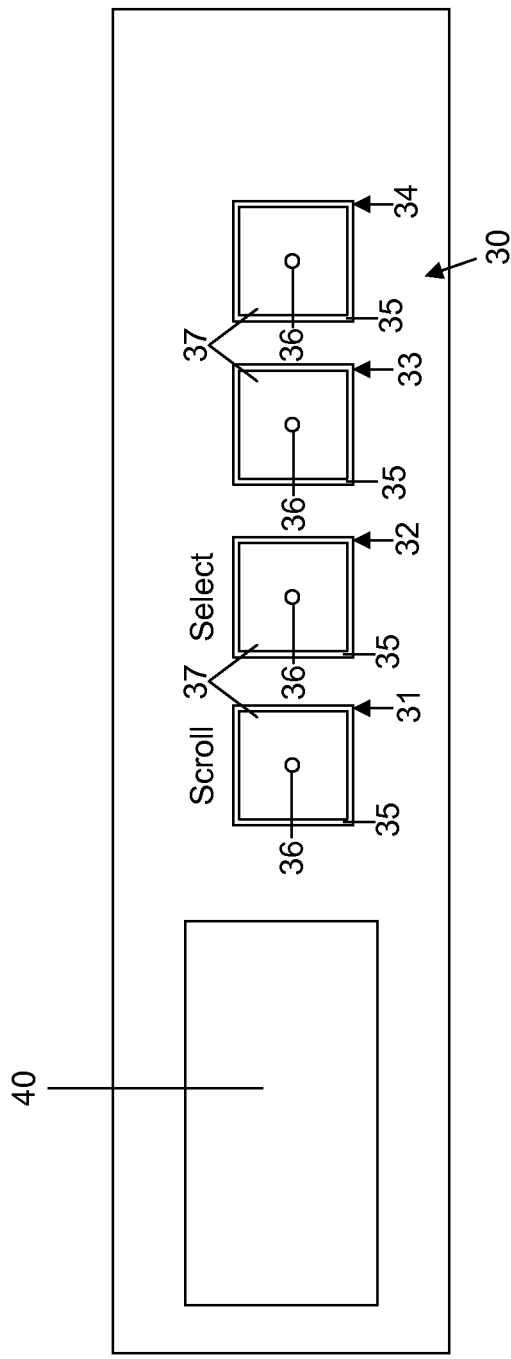
FIG. 3 depicts a front view of an infrared interface provided with infrared buttons.
Figure 4:
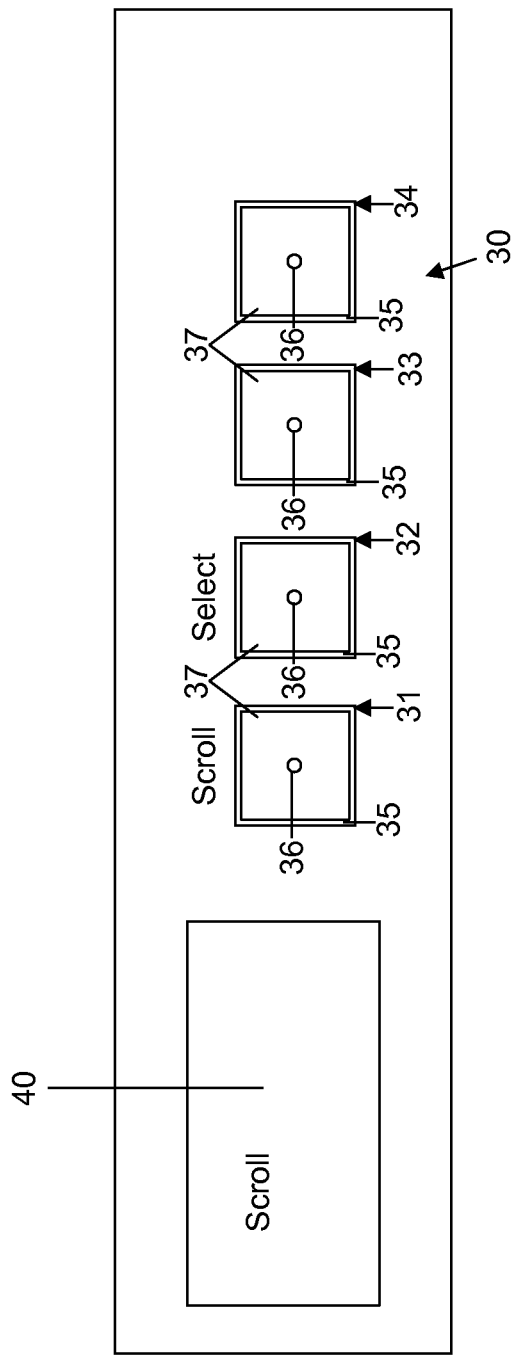
FIG. 4 depicts a front view of an infrared interface provided with infrared buttons.
Figure 5:
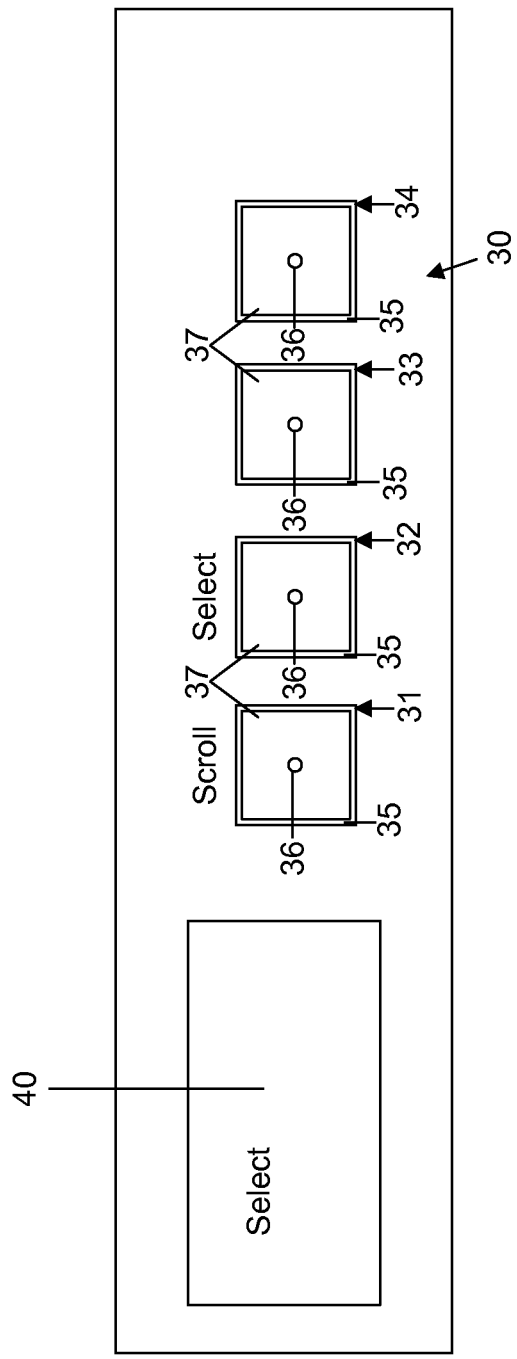
FIG. 5 depicts a front view of an infrared interface provided with infrared buttons.

As shown in FIGS. 3-5, the infrared buttons 31-34 are preferably provided with a lens 35, an infrared radiation emitter 36, and an infrared radiation detector 37. Accordingly, when an object, for example, a finger, is placed over or near a lens 35 of one of the buttons 31-34, at least a portion of infrared radiation emitted by the infrared radiation emitter 36 passes through the lens 35, is reflected by the object, and detected by the infrared radiation detector 37. When this occurs, the button 31-34 triggers a response, for example, and not limitation, the activation or deactivation of the one or more electronics 20 and/or sensor assembly 10, the display of information, including, for example, and not limitation, configuration options, the current configuration, a menu, one or more measured characteristic of the substance, or any alarms or error messages, or the selection of an option.

Since almost any object placed on a lens 35 or even near a lens 35 is capable of reflecting the infrared radiation, it is a problem that infrared radiation may be unintentionally reflected and an infrared button 31, 32, 33, or 34 may be unintentionally activated. When this occurs, the electrical device may be unintentionally configured in some manner. For example, and not limitation, in the case of the flow measuring device 5, the flow measuring device 5 may deactivate and go into an offline state, whereat the measurement of one or more characteristics of flowing substances ceases to occur. By way of yet another example, and not limitation, in the case of the flow measuring device 5, the flow measuring device 5 may to be unsatisfactorily configured, whereby the measurement of one or more characteristics of flowing substances is inaccurate.

Advantageously, according to one aspect of the present embodiment a button sequence is used to prevent inadvertent configuration. Since it is within the scope of the present invention to utilize a button sequence, as hereinafter discussed, in a conjunction with any infrared interface for any electrical device, and not just an infrared interface 30 for a flow measuring device 5 and since certain types of unintentional configuration may not be particularly problematic in every infrared interface or even every flow measuring device, it is not necessary that one or more button sequences be used to prevent every possible inadvertent configuration. By way of example, and not limitation, one or more button sequences may be used to prevent one or more types of configurations, for example, deactivation, while still permitting one or more types of configurations to occur without use of the button sequence, for example, activation.

According to one aspect of the present embodiment, the button sequence requires at least two different buttons, 31, 32, 33, or 34 to be activated. In this manner, unintentionally touching one button or the presence of debris or liquid on one button is incapable of generating an inadvertent configuration. Those of ordinary skill in the art will appreciate that including more buttons in the button sequence further decreases the chances of an inadvertent configuration. Accordingly, it is within the scope of the present invention to include any number of buttons in the button sequence. Furthermore although it is within the scope of the present embodiment for the button sequence to require a first button, for example, and not limitation, a button 31, 32, 33, or 34, to be activated once and then at least a second button that is different from the first button to be activated once, it is also within the scope of the present invention for the button sequence to require a first and at least a second button to be activated more than once. For example, and not limitation, a particular sequence may require the buttons 31, 32, 33, 34 to be activated in the following sequence 31, 32, 33, 34, 34, 33, 32, 31.

According to another aspect of the present embodiment, the display 40 indicates the particular button that must be activated during each step of the sequence. This indication may take a variety of forms. For example, and not limitation, the indication may take the form of showing one or more steps in the sequence simultaneously on the display 40. Alternatively, the display 40 may indicate the steps one at a time, for example only the current step to be performed in the sequence. In this manner, a user is not required to memorize or know the particular button sequence.

For example, as shown in FIGS. 3 and 4, when a user desires to take some configuration action, for example, and not limitation, opening a menu, selecting an option, deactivating the electrical device, or activating the electrical device, a button sequence may be required.

By way of example, and not limitation, one possible sequence may involve scroll and select buttons 31, 32, shown in FIGS. 3-5. Accordingly, for example, and not limitation, either before or after a user activates one or more buttons 31-34 for in order to configure the device, the display will prompt the user to enter a button sequence. In the present example, the button sequence involves first activating the scroll button 31 and then activating the select button 32. At initiation of the button sequence, the display 40 may display the entire button sequence on the display, i.e. the word scroll followed by the word select. Alternatively, the display 40 may indicate only the current step of the sequence. For example, as shown in FIG. 4, at the initiation of the sequence, the display 40 may indicate the word scroll, or the first step in the sequence, without any other step of the sequence, and, then, after activation of the scroll button 31, as shown in FIG. 5, the display 40 may indicate the word select without any other step of the sequence.

Although the sequence may require only the activation of two buttons, it may, within the scope of the present invention, require the activation of more than two buttons, for example, three buttons, four buttons, or any number more than four. Furthermore, the sequence may require two or more buttons to be activated simultaneously. In such situations, within the scope of the present embodiment, the sequence may consist of a single step, i.e. simultaneous activation of two or more buttons. Additionally, the sequence may include entering two or more buttons sequentially.

According to another aspect of the present embodiment, the sequence may be required to be performed within in a certain time limit. Within the scope of the present embodiment, the time limit can be imposed in a variety of manners. For example, and not limitation, the time limit can be imposed on the overall sequence; for example, and not limitation, the total time for completion of all steps in the sequence must not exceed some value. By way of yet another example, and not limitation, a time limit can be imposed on each step; for example, and not limitation, the time for completion of each individual step in the sequence must not exceed some value. Those of ordinary skill in the art will appreciate that the time limit further reduces the chances of inadvertent configurations.

Those of ordinary skill in the art will appreciate that it is within the scope of the present invention to utilize the above-referenced techniques to prevent certain configuration actions and to use a password to prevent certain other configuration actions. By way of example, inadvertent deactivation may be prevented by using a password, which must be known by the user, and the inadvertent activation, opening of a menu, or selection of an option may be prevented by using one or more button sequences, as discussed above.

Those of ordinary skill in the art will appreciate that the button sequence can be static or dynamic. By way of example, and not limitation, it is within the scope of the present invention to allow the user to select or change the particular button sequence used for one or more actions. By way of another example, and not limitation, one or more button sequences can be preprogrammed. By way of yet another example, different button sequences may be required for different types of configurations.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A method for preventing an inadvertent configuration of an electrical device provided with an infrared interface (30), comprising the steps of:
   activation of one or more infrared buttons (31, 32, 33, or 34) provided on the infrared interface (30) in order to configure the electrical device, wherein at least one of the one or more infrared buttons (31, 32, 33, or 34) is activated by detecting infrared radiation emitted by an infrared radiation emitter (36) and received by a radiation detector (37), the infrared radiation passing through a lens (35) a first time, reflecting back towards the lens (35), and passing through the lens (35) a second time;
   indicating an infrared button sequence on a display (40), wherein said button sequence includes activation of at least a first infrared button (31, 32, 33, or 34) and at least a second infrared button (31, 32, 33, or 34) of the one or more infrared buttons (31, 32, 33, or 34) used to configure the electrical device; and
   entering the infrared button sequence to activate the one or more infrared buttons before the configuration occurs.

2. The method according to claim 1, wherein the infrared button sequence includes the step of activation of at least two buttons (31, 32, 33, or 34) sequentially.

3. The method according to claim 1, wherein the infrared button sequence includes the step of activation of at least two buttons (31, 32, 33, or 34) simultaneously.

4. The method according to claim 1, wherein a time limit is imposed on the infrared button sequence or at least one step in the infrared button sequence.

5. The method according to claim 1, wherein the electrical device is a measurement device.

6. The method according to claim 1, wherein the step of activation of the one or more infrared buttons (31, 32, 33, or 34) provided on the infrared interface (30) in order to configure the electrical device occurs before the step of entering the infrared button sequence.

7. The method according to claim 1, wherein the step of activation of the one or more infrared buttons (31, 32, 33, or 34) provided on the infrared interface (30) in order to configure the electrical device occurs after the step of entering the infrared button sequence.

8. A non-transitory computer program product comprising computer usable medium including executable code for executing a process for preventing an inadvertent configuration of an electrical device provided with an infrared interface (30), the process comprising the steps of:
  activation of one or more infrared buttons (31, 32, 33, or 34) provided on the infrared interface (30) in order to configure the electrical device, wherein at least one of the one or more infrared buttons (31, 32, 33, or 34) is activated by detecting infrared radiation emitted by an infrared radiation emitter (36) and received by a radiation detector (37), the infrared radiation passing through a lens (35) a first time, reflecting back towards the lens (35), and passing through the lens (35) a second time;
  indicating an infrared button sequence on a display (40), wherein said button sequence includes activation of at least a first infrared button (31, 32, 33, or 34) and at least a second infrared button (31, 32, 33, or 34) of the one or more infrared buttons (31, 32, 33, or 34) used to configure the electrical device; and
  entering the infrared button sequence to activate the one or more infrared buttons before the configuration occurs.

9. The non-transitory computer program product according to claim 8, wherein the infrared button sequence includes the step of activation of at least two buttons (31, 32, 33, or 34) sequentially.

10. The non-transitory computer program product according to claim 8, wherein the infrared button sequence includes the step of activation of at least two buttons (31, 32, 33, or 34) simultaneously.

11. The non-transitory computer program product according to claim 8, wherein a time limit is imposed on the infrared button sequence or at least one step in the infrared button sequence.

12. The non-transitory computer program product according to claim 8, wherein the electrical device is measurement device.

13. The non-transitory computer program product according to claim 8, wherein the step of activation of the one or more infrared buttons (31, 32, 33, or 34) provided on the infrared interface (30) in order to configure the electrical device occurs before the step of entering the infrared button sequence.

14. The non-transitory computer program product according to claim 8, wherein the step of activation of the one or more infrared buttons (31, 32, 33, or 34) provided on the infrared interface (30) in order to configure the electrical device occurs after the step of entering the infrared button sequence.

15. A system for preventing an inadvertent configuration of an electrical device provided with an infrared interface (30), comprising:
  the electrical device;
  the infrared interface (30) provided with a plurality of infrared buttons (31, 32, 33, or 34), wherein one or more of the infrared buttons (31, 32, 33, or 34) of the one or more infrared buttons (31, 32, 33, or 34) used to configure the electrical device are activated in order to configure the electrical device, wherein the infrared buttons (31, 32, 33, or 34) include a lens (35), an infrared radiation emitter (36), and an infrared radiation detector (37) and wherein the plurality of IrDA buttons (31, 32, 33, or 34) are activated by using the radiation detector (37) to detect infrared radiation emitted by the infrared radiation emitter (36) and reflected toward the radiation detector (37), wherein the infrared radiation passing through a lens (35) a first time, reflecting back towards the lens (35), and passing through the lens (35) a second time; and
  a display (40) that indicates an infrared button sequence that is entered to activate the one or more infrared buttons before the configuration occurs, wherein the infrared button sequence includes activation of at least a first infrared button (31, 32, 33, or 34) and at least a second infrared button (31, 32, 33, or 34).

16. The system according to claim 15, wherein the infrared button sequence includes activation of at least two buttons (31, 32, 33, or 34) sequentially.

17. The system according to claim 15, wherein the infrared button sequence includes activation of at least two buttons (31, 32, 33, or 34) simultaneously.

18. The system according to claim 15, wherein a time limit is imposed on the infrared button sequence or at least one step in the infrared button sequence.

19. The system according to claim 15, wherein the electrical device is a measuring device.

20. The system according to claim 15, wherein the activation of the one or more infrared buttons (31, 32, 33, or 34) provided on the infrared interface (30) in order to configure the electrical device occurs before entering the infrared button sequence.

21. The system according to claim 15, wherein the activation of the one or more infrared buttons (31, 32, 33, or 34) provided on the infrared interface (30) in order to configure the electrical device occurs after the entering the infrared button sequence.

* * * * *